United States Patent [19]

Bove

[11] 3,819,523

[45] June 25, 1974

[54] COMPOSITION FOR CLEANING ADHERING HARDENED CONCRETE AND FOR STRIPPING CONCRETE AND PLASTER

[75] Inventor: Fred Bove, Warken, Luxembourg

[73] Assignee: Importec Technical Improvement S.A., Friboug, Switzerland

[22] Filed: Nov. 6, 1972

[21] Appl. No.: 303,943

[52] U.S. Cl................ 252/89, 106/38.24, 252/171, 252/364
[51] Int. Cl............................................ C11d 15/04
[58] Field of Search............ 252/89, 162, 171, 364; 106/38.24

[56] References Cited
UNITED STATES PATENTS
2,400,001 5/1946 Grubelli........................... 106/38.24
2,840,479 6/1958 Rowell et al..................... 106/38.24

FOREIGN PATENTS OR APPLICATIONS
611,431 12/1960 Canada............................ 106/38.24

OTHER PUBLICATIONS

Lea et al., The Chem. of Cement & Concrete, (1956), Edward Arnold Ltd., p. 573–591.
Rose The Cond. Chem Dict., Vol. 7, pp. 552, 822, 833.

*Primary Examiner*—William E. Schulz
*Attorney, Agent, or Firm*—Young & Thompson

[57] ABSTRACT

This invention relates to a composition for cleaning adhering hardened concrete and for stripping concrete and plaster. The composition comprises mineral oil and/or hydrocarbon and contains at least one glyceride. The improvement consists in that the latter contains, in addition a wetting agent derived from plant or animal fats, such as saponin, lecithin, glycinin, phytosterin and rosin.

2 Claims, No Drawings

COMPOSITION FOR CLEANING ADHERING HARDENED CONCRETE AND FOR STRIPPING CONCRETE AND PLASTER

This invention relates to a composition for cleaning hardened adhering concrete and for stripping concrete and plaster.

The invention also relates to the process for applying the above-mentioned composition on the surface of objects to be cleaned and on the internal surface of the casing or mould which is to receive the concrete or plaster in order to facilitate the stripping of the hardened concrete or plaster.

It has been noted for a long time that fats of animal or plant origin stored in concrete tanks attack the latter causing it to disintegrate slowly (see, in particular, Tonindustrie Zeitung, vol. No. 100, 1912). This results from attack of the hydrated lime produced upon hydration of the di- and tri-calcium silicates existing in the cement by the glycerides contained in the fats.

The hydration reactions can be written as follows:

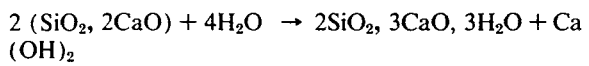

$2 (SiO_2, 2CaO) + 4H_2O \rightarrow 2SiO_2, 3CaO, 3H_2O + Ca(OH)_2$ and

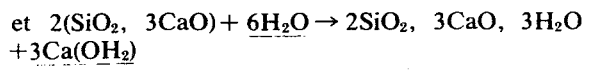

et $2(SiO_2, 3CaO) + 6H_2O \rightarrow 2SiO_2, 3CaO, 3H_2O + 3Ca(OH_2)$

The reaction leading to attack of the hydrated lime $Ca(OH)_2$ formed occurs as follows:

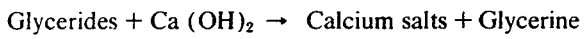

Glycerides + $Ca(OH)_2 \rightarrow$ Calcium salts + Glycerine

This reaction, therefore, leads to the formation of calcium salts or calcium soaps sparingly soluble in water which prevent the setting of cement as the following experiment shows:

A mortar consisting of 50 percent by volume of artificial Portland cement and 50 percent sand is hydrated with half its volume of water. During the working of this mortar, olein (glyceride of oleic acid) is added as olive oil mixed with an equal volume of gas oil in the proportion of approximately 10 percent by volume of the mortar.

It is noted that the rise in temperature due to the heat given off by the hydration reaction of the cement is stopped and that the setting of the cement goes no further. Two weeks later, the mortar, instead of being hardened, disintegrates when a sharp object is driven into it.

A comparable result can be obtained by replacing olein with the following glycerides: palmitin, stearin, arachidin, linolein, linolerin, ricinolein, erucin, rapin, added to the mortar as peanut oil, linseed oil, castor oil, rape seed oil, coleseed oil, cotton-seed oil, tall-oil, soybean oil or mustard oil.

However, the thus treated mortar is still too compact and not sufficiently friable for the process to be of any substantial industrial value.

The application of a glyceride or of a composition comprising mineral oil and/or gas oil and a glyceride would not lead to the satisfactory cleaning of a surface with adhering hardened concrete. Similarly, the application of a glyceride or of such a composition on the walls of a casing would not facilitate stripping of the concrete once it has hardened.

The object of this invention is to correct the above-mentioned drawbacks by providing a composition which makes the concrete friable under slight pressure or slight friction, the object of the invention being to use this composition for cleaning adhering hardened concrete or for the stripping of concrete (or plaster) after the application of the composition on the internal surface of the casing or of the mould designed to receive the concrete (or plaster).

According to the invention, the composition for cleaning adhering hardened concrete (or plaster) and for stripping concrete (or plaster), this composition comprising mineral oil and/or a hydrocarbon and containing at least one glyceride, is characterized in that it contains, in addition, a wetting agent derived from plant or animal fats.

It has been noted, according to the invention, that a large number of wetting agents derived from plant or animal fats have the remarkable property of wetting, in a highly satisfactory manner, metal, wooden of plastic surfaces conventionally used as materials in casings or moulds for concrete or plaster.

According to a preferred embodiment of the invention, the wetting agent is derived from plant matter and is chosen from among saponin, lecithin, glycinin, phytosterin and rosin.

It is known that saponin is extracted from saponaria, the quillaia-tree, the Savindus nut, the India chestnut, lecithin and glycinin from soybean oil and that phytosterin and rosin exist in tall-oil.

These products have remarkable wetting properties. Their presence in the mineral, hydrocarbar and glyceride based composition provides the latter with a definitely increased efficiency and considerably limits the quantity of product to be applied in order to clean adhering hardened concrete and for the stripping of concrete or plaster.

Their wetting properties make it possible to obtain, upon application to a surface, a uniform film without having to use a substantial quantity of the product. The uniformity of the film is indeed essential in the case, in particular, of the stripping of concrete if it is desired to avoid sharp parts or cavities corresponding to areas on the surface on the casing where the applied film presents a break or, on the contrary, where the thickness is too great.

The wetting agents derived from plant fats are, in addition, remarkable foaming agents: indeed, they produce an abundant foam upon contact with concrete, this foam being produced during saponification of the hydrated lime contained in the concrete. This substantial production of foam causes the superficial layer of the concrete, in intimate contact with the applied composition, to become hollow and, as a result, extremely friable. The same reactions occur with plaster: indeed, anhydrous calcium sulfate is involved which, through hydration upon setting, produces an alkaline medium which enhances the formation of analogous calcium soaps.

According to a preferred embodiment of the invention, the composition contains the following compounds within the limiting proportions, by volume, indicated below:

| | |
|---|---|
| mineral oil and/or gas oil | 40 to 97% |
| GLYCERIDE | 1 to 60% |
| saponin and/or lecithin and/or rosin | 0.1 to 3% |

Indeed, it has been noted that this composition was already very efficient with a proportion by volume of 0.1 percent of saponin, lecithin and/or rosin. This proportion, by the way, is preferably limited to 3 percent so as not to excessively attack the superficial layer of the concrete or plaster.

According to a preferred embodiment of the invention, the composition being more particularly designed for the cleaning of adhering hardened concrete contains the following compounds within the limiting proportions by volume indicated below:

| | |
|---|---|
| mineral oil having an Engler viscosity of approximately 1.4 at 20°C and/or gas oil | 20 to 45% |
| glyceride | 40 to 80% |
| saponin and/or lecithin and/or rosin | 0.1 to 3% |

Among the non-drying glycerides, the glycerides contained in olive, peanut, castor and coleseed oil are preferred.

The above-mentioned composition is in the form of a low viscosity liquid which makes it possible to spray it easily with an atomizer.

According to another preferred embodiment of the invention, the composition being more particularly designed for stripping concrete of conventional quality, the following compounds are mixed within the limiting proportions by volume indicated below:

| | |
|---|---|
| mineral oil having an Engler viscosity of approximately 1.4 at 20°C and/or gas oil | 85 to 97% |
| non drying glyceride | 1 to 10% |
| drying or semi-drying glyceride | 0.1 to 3% |
| saponin and/or lecithin and/or rosin | 0.1 to 1% |

It was noted that it is advantageous to add a drying or semi-drying glyceride simultaneously with the non drying glyceride and other components of the composition; indeed, this composition, once applied to the walls of the casing must not be washed out by rain when the casing is not protected. The phenomenon of washing out which would be harmful to the stripping of concrete is eliminated when the composition contains a drying or semi-drying glyceride such as the glycerides contained in linseed, tall, rape, mustard, cotton-seed and soybean oil.

According to a third preferred embodiment of the invention, the composition being more particularly designed for the stripping of dried concrete, the following components are mixed within the limiting proportions by volume indicated below:

| | |
|---|---|
| mineral oil having an Engler viscosity of approximately 1.4 at 20°C and/or gas oil | 85 to 97% |
| non drying glyceride | 1 to 14% |
| saponin and/or lecithin and/or rosin | 0.1 to 1% |

As far as dried concretes are concerned, the action of the drying or semi-drying glyceride has been found to be harmful, expecially when drying is carried out at temperatures of the order of 70°C. It is to be noted, however, that, in this case, washing out of the applied composition is not to be apprehended, the concretes being normally prepared and introduced in the casing away from rain.

As far as architectural concretes obtained using white cement are concerned, it was shown, in addition, that the fluid mineral oil and/or gas oil used should contain a maximum of 0.4 percent by weight of sulfur.

Indeed, a higher sulfur content gives rise on the surface of the concrete, after stripping, to green-yellow colored spots.

Other particularities of the invention will appear further in the following non-limiting examples.

The examples below are tests which were carried out under covered premises at a room temperature of 20°C; the casings were coated with the composition according to the examples below by spraying with an atomizer one hour after casting the concrete and the stripping was carried out 48 hours after the introduction of the concrete.

EXAMPLE I

The concretes employed where prepared using ordinary cement such as: artifical Portland, slag, quick setting, pozzolanic and fly ash cement.

The mixture applied on the casing was as follows:

| | |
|---|---|
| mineral oil having an Engler viscosity of 1.4 at 20°C | 45% |
| gas oil | 50% |
| olive oil | 3.9% |
| linseed oil | 1% |
| saponin | 0.1% |

The mixture applied as a coating was not washed out by a spray of water applied for one half hour. No adhering matter was noted upon stripping.

Identical results were obtained by replacing, in particular, olive oil with peanut oil, linseed oil with tall-oil and saponin with lecithin or rosin.

EXAMPLE II

The concrete was dried for two hours at 70°C. The composition of the mixture was as follows:

| | |
|---|---|
| mineral oil having an Engler viscosity of 1.4 at 20°C | 45% |
| gas oil | 50% |
| peanut oil | 4.9% |
| rosin | 0.1% |

Upon stripping, no adhering matter whatsoever was noted on the casing.

EXAMPLE III

The concrete was prepared from white cement. The composition of the mixture applied was as follows:

| | |
|---|---|
| mineral oil having an Engler viscosity of 1.4 at 20°C and with a sulfur content of less than 0.4%, by weight | 45% |
| gas oil with a sulfur content of less than 0.4% by weight | 50% |
| olive oil | 3.9% |
| tall-oil | 1% |
| lecithin | 0.1% |

Upon stripping, no adhering matter whatsoever was noted and the surface of the concrete was spotless.

The efficiency of the composition obtained according to the process of the invention was also determined for cleaning adhering hardened concrete.

The same composition can be advantageously used for stripping plaster. Adhering matter is eliminated. In addition, the whiteness of the plaster is maintained.

EXAMPLE IV

The surface of the internal wall of a casing showing many parts of adhering hardened concrete was spray-coated using the following composition:

| | |
|---|---|
| gas oil | 20% |
| olive oil | 19% |
| tall-oil | 60% |
| rosin | 1% |

It was noted two hours after application of the composition that the adhering concrete became extremely friable; it broke up for example, upon rubbing it slightly with a finger.

It is clear that the invention is not limited to the examples mentioned above. The compositions can, in particular, be used on all casing materials used in the building industry.

I claim:

1. Composition for stripping concrete and plaster consisting essentially of the mixture of the following compounds with substantially the proportions by volume hereinafter set forth:
   a. a mineral oil having an Engler viscosity of approximately 1.4 at 20°C.: 85 to 97 percent;
   b. a non-drying glyceride selected from the group consisting of olive, peanut, castor and coleseed oil: 1 to 14 percent; and
   c. a wetting agent derived from plant fats, selected from the group consisting of saponin, lecithin and rosin: 0.1 to 1%.

2. Composition for stripping concrete and plaster consisting essentially of the mixture of the following compounds with substantially the proportions by volume hereinafter set forth:
   a. a mineral oil having an Engler viscosity of approximately 1.4 at 20°C.: 85 to 97 percent;
   b. A non-drying glyceride selected from the group consisting of olive, peanut, castor and coleseed oil: 1 to 10 percent;
   c. a drying glyceride selected from the group consisting of lineseed, tall, rape-seed, mustard, cottonseed and soybean oil: 0.1 to 3 percent; and
   d. a wetting agent derived from plant fats selected from the group consisting of saponin, lecithin and rosin: 0.1 to 1 percent.

* * * * *

UNITED STATES PATENT OFFICE
CERTIFICATE OF CORRECTION

Patent No. 3,819,523  Dated June 25, 1974

Inventor(s) Fred Bove

It is certified that error appears in the above-identified patent and that said Letters Patent are hereby corrected as shown below:

On the cover sheet [73] Assignee, should read

-- Importec Technical Improvement --.

Signed and sealed this 3rd day of December 1974.

(SEAL)
Attest:

McCOY M. GIBSON JR.  C. MARSHALL DANN
Attesting Officer  Commissioner of Patents